(12) United States Patent
Feng

(10) Patent No.: US 11,366,580 B2
(45) Date of Patent: Jun. 21, 2022

(54) SYSTEM FOR CONTROLLING A ROTATION OF AN OBJECT ON A TOUCH SCREEN AND METHOD THEREOF

(71) Applicant: WUHAN CHINA STAR OPTOELECTRONICS SEMICONDUCTOR DISPLAY TECHNOLOGY CO., LTD., Wuhan (CN)

(72) Inventor: Xiaoliang Feng, Wuhan (CN)

( * ) Notice: Subject to any disclaimer, the term of this patent is extended or adjusted under 35 U.S.C. 154(b) by 423 days.

(21) Appl. No.: 16/466,649

(22) PCT Filed: Mar. 25, 2019

(86) PCT No.: PCT/CN2019/079406
§ 371 (c)(1),
(2) Date: Jun. 5, 2019

(87) PCT Pub. No.: WO2020/118961
PCT Pub. Date: Jun. 18, 2020

(65) Prior Publication Data
US 2021/0326028 A1    Oct. 21, 2021

(30) Foreign Application Priority Data

Dec. 12, 2018  (CN) .......................... 201811516967.X

(51) Int. Cl.
*G06F 3/048*     (2013.01)
*G06F 3/04845*   (2022.01)
*G06F 3/0488*    (2022.01)

(52) U.S. Cl.
CPC ........ *G06F 3/04845* (2013.01); *G06F 3/0488* (2013.01)

(58) Field of Classification Search
CPC ....... G06F 3/04883; G06F 2203/04808; G06F 3/0488; G06F 3/04842; G06F 3/017;
(Continued)

(56) References Cited

U.S. PATENT DOCUMENTS 8,219,936 B2 *   7/2012   Kim .................... G06F 3/04886
                                                    715/708
9,767,535 B2 *   9/2017   Bhatt ...................... G06T 11/00
(Continued)

FOREIGN PATENT DOCUMENTS

CN    103186341 A   7/2013
CN    103777857 A   5/2014
(Continued)

OTHER PUBLICATIONS

Wang et al., 3D Multi-Touch Recognition Based Virtual Interaction, 2010, IEEE; 4 pages.*

*Primary Examiner* — Linh K Pham

(57) ABSTRACT

A system for controlling a rotation of an object on a touch screen includes a touch screen interface, a single touch setting module for detecting a single touch action, a single touch driving module for receiving information from the single touch setting module and activating a rotating action on the object, and an image processing module including an object rotating module which rotates the object and an object scaling module which scales the object size to fit with the touch screen interface. A method for controlling a rotation of an object on a touch screen interface includes executing single touch, activating a rotating action, rotating the object, and stopping the rotating action of the object. There is a predetermined time between the activating the rotating action and the executing single touch. When the object executes the rotation action, the object size is scaled to fit with the touch screen interface.

7 Claims, 3 Drawing Sheets

(58) Field of Classification Search
CPC ............. G06F 3/04845; G06F 3/03545; G06F 2203/04806; H04N 1/00161
See application file for complete search history.

(56) References Cited

U.S. PATENT DOCUMENTS

| | | | | |
|---|---|---|---|---|
| 10,503,269 B2* | 12/2019 | Stafford | ............ | G02B 27/0172 |
| 2006/0232611 A1* | 10/2006 | Brooke | ................... | G09G 5/08 |
| | | | | 345/671 |
| 2009/0265670 A1* | 10/2009 | Kim | ................... | G06F 3/04883 |
| | | | | 715/863 |
| 2010/0097322 A1* | 4/2010 | Hu | ..................... | G06F 3/04883 |
| | | | | 345/173 |
| 2011/0029917 A1* | 2/2011 | Um | ..................... | G06F 3/04883 |
| | | | | 715/800 |
| 2011/0234522 A1* | 9/2011 | Lin | ..................... | G06F 3/04883 |
| | | | | 345/173 |
| 2011/0304584 A1* | 12/2011 | Hwang | ............... | G06F 3/04847 |
| | | | | 345/173 |
| 2013/0222275 A1* | 8/2013 | Byrd | ..................... | G06F 3/0488 |
| | | | | 345/173 |
| 2015/0002433 A1 | 1/2015 | Karlsson et al. | | |
| 2015/0116232 A1* | 4/2015 | Hayakawa | ............... | G09G 5/38 |
| | | | | 345/173 |
| 2015/0220260 A1 | 8/2015 | Hou et al. | | |
| 2016/0171660 A1* | 6/2016 | Sun | ........................ | G06F 3/011 |
| | | | | 345/656 |

FOREIGN PATENT DOCUMENTS

| | | |
|---|---|---|
| CN | 103959221 A | 7/2014 |
| CN | 105242841 A | 1/2016 |
| CN | 108304116 A | 7/2018 |
| KR | 20110066545 A | 6/2011 |

* cited by examiner

SYSTEM FOR CONTROLLING A ROTATION OF AN OBJECT ON A TOUCH SCREEN AND METHOD THEREOF

BACKGROUND OF INVENTION

Field of Invention

The present invention relates to a system for controlling a rotation of an object on a touch screen and method thereof, and more particularly, to a system for controlling a rotation of an object on a touch screen of a mobile device and method thereof.

Description of Prior Art

Currently, rotating an object on the mobile device is mostly through a rotary button of the touch screen, and the user cannot perform the object in a nonlinear rotation by a single touch. It is known that the two-finger touch is used to rotate an object of the mobile device, but it is still cannot rotate the object at an arbitrary angle, and the object cannot be automatically scaled to fit the screen size while rotating. Therefore, it is necessary to provide a simple operation method to rotate the object on the touch screen to improve the existing technology.

SUMMARY OF INVENTION

Rotating an object on the mobile device is mostly through a rotary button of the touch screen, and the user cannot perform the object in a nonlinear rotation by single touch. Also, the user cannot rotate the object at arbitrary angle, and the object cannot be automatically scaled to fit the screen size while rotating.

In one embodiment, a system for controlling a rotation of an object on a touch screen includes a touch screen interface, a single touch setting module for detecting a single touch action, a single touch driving module for receiving information from the single touch setting module and activating a rotating action on the object, and an image processing module including an object rotating module which rotates the object and an object scaling module which scales the object size to fit with the touch screen interface.

In one embodiment, the single touch action is performed for a predetermined time.

In one embodiment, the predetermined time is about 3 seconds

In one embodiment, the object rotating module rotates the object in a clockwise direction.

In one embodiment, the object rotating module rotates the object in a counterclockwise direction.

In one embodiment, when the object rotating module rotates the object, a rotation angle is displayed on the touch screen interface, and when the object rotating module stops rotating the object, the object remains rotated at the rotation angle.

In one embodiment, the object comprises an image or a video.

In one embodiment, the object rotating module rotates the object at an arbitrary angle.

In one embodiment, a method for controlling a rotation of an object on a touch screen comprises executing single touch on a touch screen interface, activating a rotating action, rotating the object, and stopping the rotating action of the object, and there is a predetermined time between the activating the rotating action and the executing single touch, and when the object executes the rotation action, the object size is scaled to fit with the touch screen interface.

In one embodiment, the predetermined time is about 3 seconds.

In one embodiment, the object rotating module rotates the object in a clockwise direction.

In one embodiment, the object rotating module rotates the object in a counterclockwise direction.

In one embodiment, when the object rotating module rotates the object, a rotation angle is displayed on the touch screen interface, and when the object rotating module stops rotating the object, the object remains rotated at the rotation angle.

In one embodiment, the object comprises an image or a video.

In one embodiment, the object rotating module rotates the object at an arbitrary angle.

In one embodiment, a system for controlling a rotation of an object on a touch screen includes a touch screen interface, a single touch setting module for detecting a single touch action, a single touch driving module for receiving information from the single touch setting module and activating a rotating action on the object, and an image processing module including an object rotating module which rotates the object and an object scaling module which scales the object size to fit with the touch screen interface. The single touch action is performed for a predetermined time, and the object rotating module rotates the object at an arbitrary angle.

In one embodiment, the predetermined time is about 3 seconds

In one embodiment, the object rotating module rotates the object in a clockwise direction.

In one embodiment, the object rotating module rotates the object in a counterclockwise direction.

In one embodiment, when the object rotating module rotates the object, a rotation angle is displayed on the touch screen interface, and when the object rotating module stops rotating the object, the object remains rotated at the rotation angle.

DETAILED DESCRIPTION OF PREFERRED EMBODIMENTS

In order to make the above description of the present invention more comprehensible, the preferred embodiments will be described in detail below with reference to the accompanying drawings.

Figure 1:
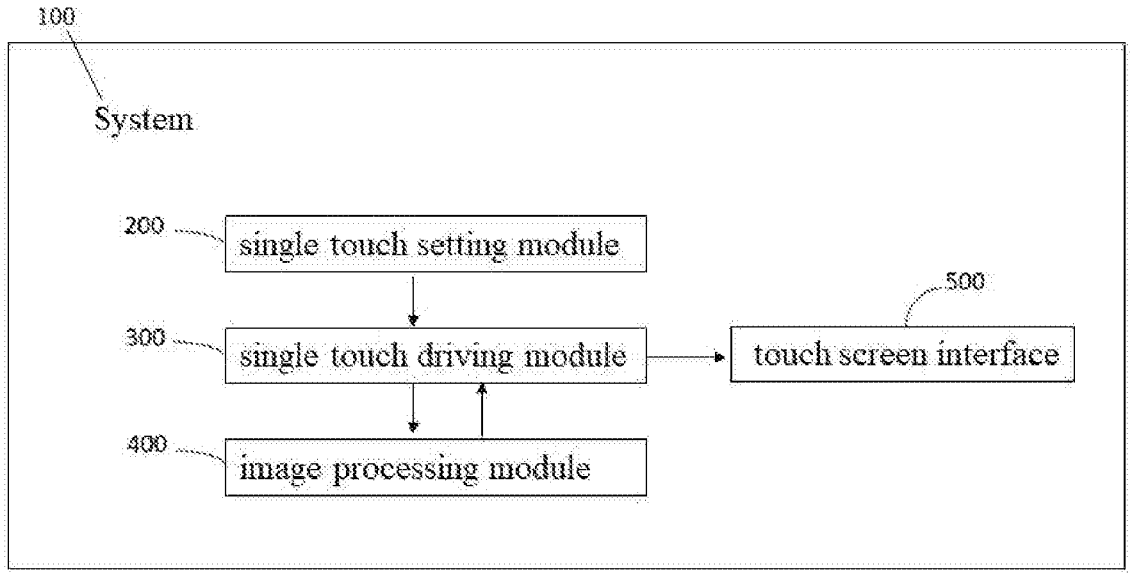
FIG. 1 is a schematic view of a system for controlling a rotation of an object on a touch screen according to one embodiment of the present invention.

Referring to FIG. 1, in one embodiment, a system 100 for controlling a rotation of an object on a touch screen includes a single touch setting module 200, a single touch driving module 300, an image processing module 400, and a touch screen interface 500. The single touch setting module 200 detects a single touch action. The single touch driving module 300 receives information from the single touch setting module and activates a rotating action on the object. The image processing module 400 includes an object rotating module 401 and an object scaling module 402. The object rotating module 401 rotates the object, and the object scaling module 402 scales the object size to fit with the touch screen interface.

Specifically, when user performs a touch action, the single touch setting module 200 of the system 100 detects a single touch action. The user's single touch action needs to continue for a predetermined time, and the predetermined time is about 3 seconds. The single touch setting module 200 transmits the processed information to the single touch driving module 300, and then the single touch driving module 300 transmits the processed information to the image processing module 400. The image processing module 400 includes an object rotating module 401 and an object scaling module 402. The object rotation module 401 and the object scaling module 402 feedback of the object rotating information and the object scaling information to the single touch driving module 300. At this time, the single touch driving module 300 activates a rotating action and a zooming action on the object and transmits the rotating action and the zooming action to the touch screen interface 500. Preferably, the object includes, but is not limited to, an image or a video, and the rotation may be a clockwise rotation or a counterclockwise rotation, and the rotation angle is an arbitrary angle. When the object is rotating, a rotation angle is displayed on the touch screen interface 500. When the object rotation module 401 stops rotating the object, the object remains rotated at the rotation angle. In addition, the object can be zoomed to fit the touch screen interface 500. That is, the object size can be automatically adjusted to conform to an area of the screen, and the user does not need to perform additional actions to adjust the object size.

Figure 2:
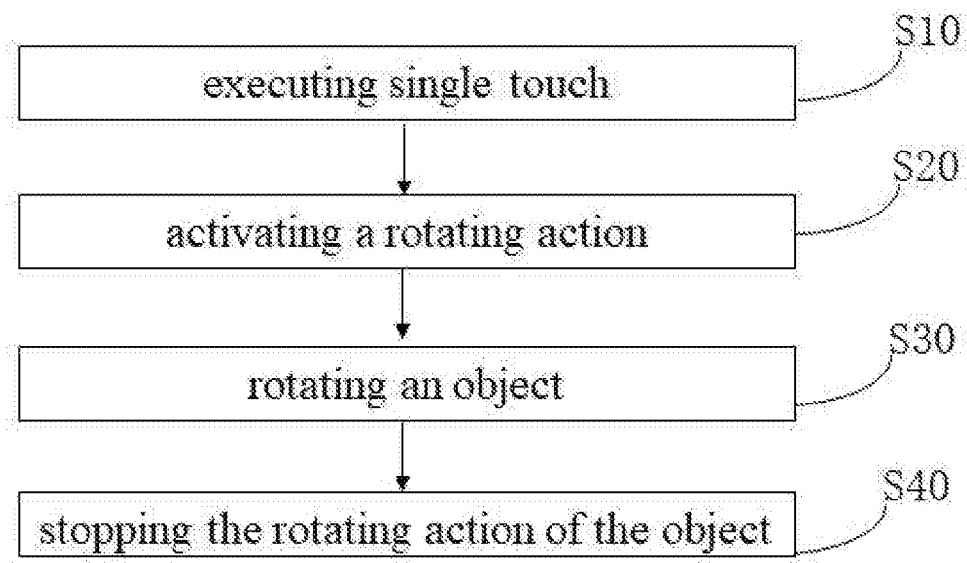
FIG. 2 is a flow chart of a method for controlling a rotation of an object on a touch screen according to one embodiment of the present invention.

Referring to FIG. 2, in one embodiment, a method for controlling a rotation of an object on a touch screen comprises executing single touch S10 on the touch screen interface, activating a rotating action S20, rotating the object S30, and stopping the rotating action of the object S40. There is a predetermined time between the activating the rotating action S20 and the executing single touch S10. The predetermined time is about 3 seconds. In addition, when the object executes the rotation action, the object size is scaled to fit with the touch screen interface. The user does not need to perform additional actions to adjust the object size. Preferably, the object includes, but is not limited to, an image or a video, and the rotation may be a clockwise rotation or a counterclockwise rotation, and the rotation angle is an arbitrary angle.

Figure 3:
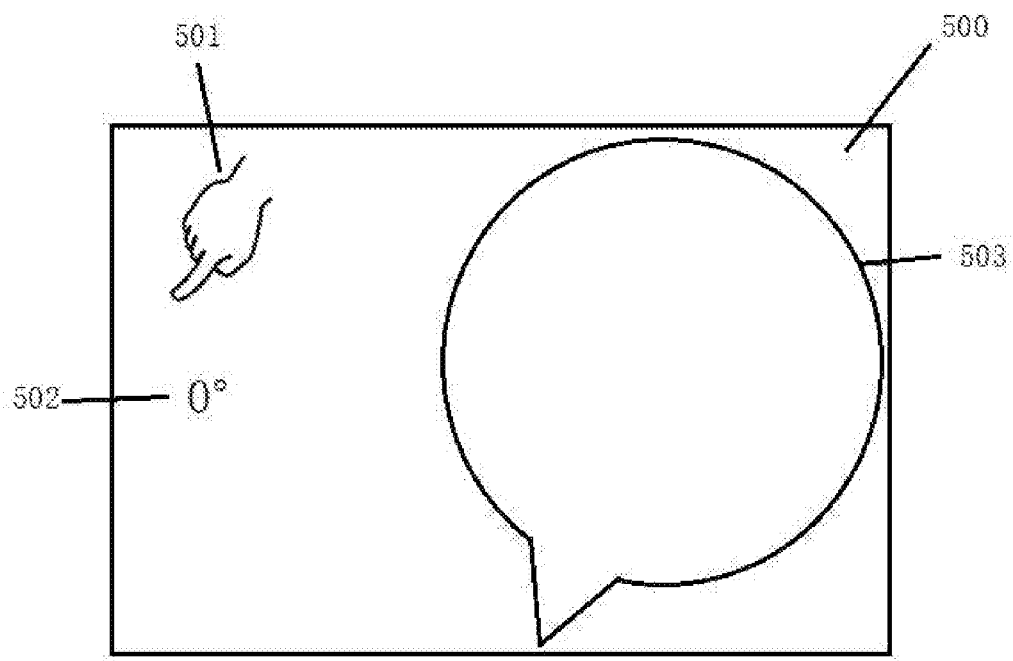
FIG. 3, FIG. 4, and FIG. 5 are schematic views of controlling a rotation of an object on a touch screen according to one embodiment of the present invention.
Figure 4:
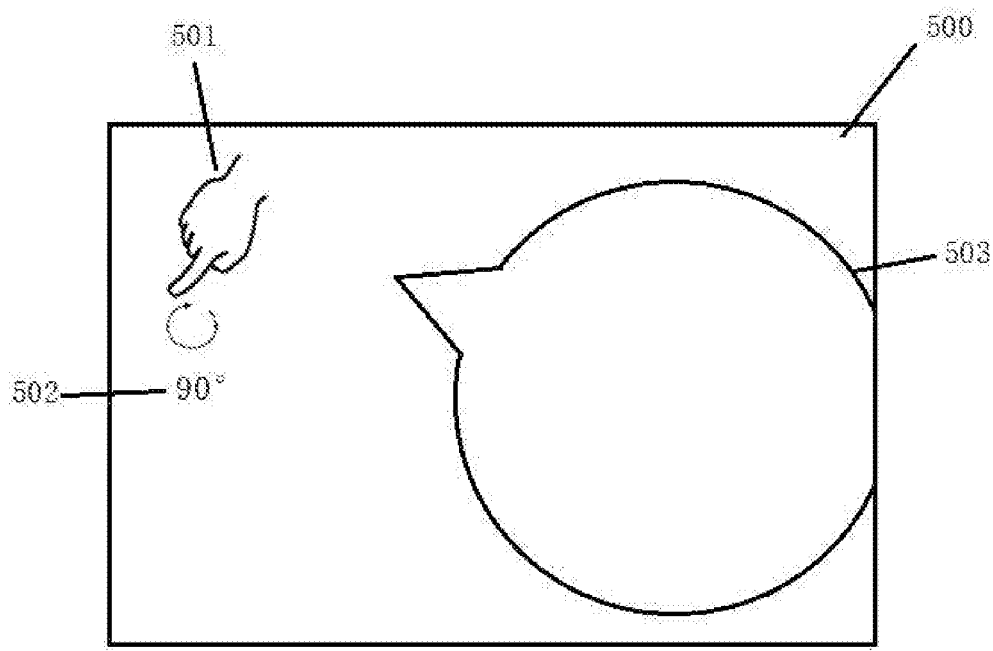
Figure 5:
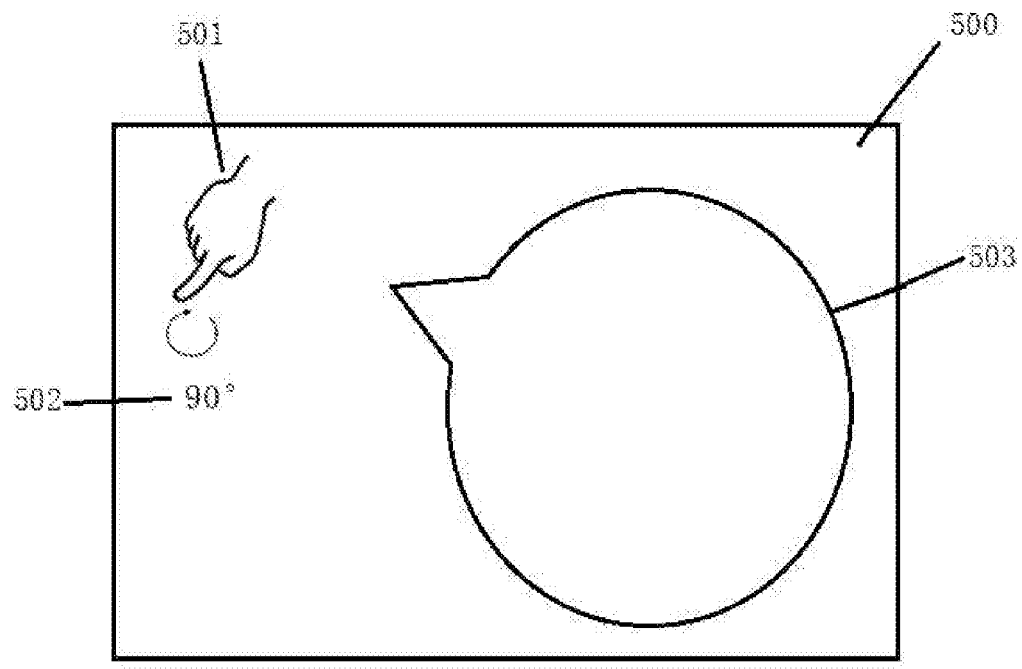

Referring to FIG. 3, FIG. 4, and FIG. 5, in order to make a person skilled in the art to understand the content of embodiments. The FIG. 3, FIG. 4, and FIG. 5 specific embodiments for controlling the rotation of an object on a touch screen. First, the user's finger 501 executing single touch on the touch screen interface 500 for a predetermined time (as shown in FIG. 3), and the predetermined time is about 3 seconds. Then, the user's finger 501 touches the touch screen interface 500 to rotate the object in a clockwise direction. At this time, the touch screen interface also displays a rotation angle 502 (as shown in FIG. 4), for example 90 degrees, and of course, it can also rotate the object in a counterclockwise direction which is depended on the user's needs. An image 503 in the touch screen interface 500 is also rotated 90 degrees in a counterclockwise direction while user's finger is rotating. If the image 503 size exceeds the touch screen interface 500 (as shown in FIG. 4), the image 503 size is automatically adjusted to fit with an area of the touch screen interface 500 (as shown in FIG. 5), and the user does not need to perform additional actions to adjust the image 503 size.

Figure 6:
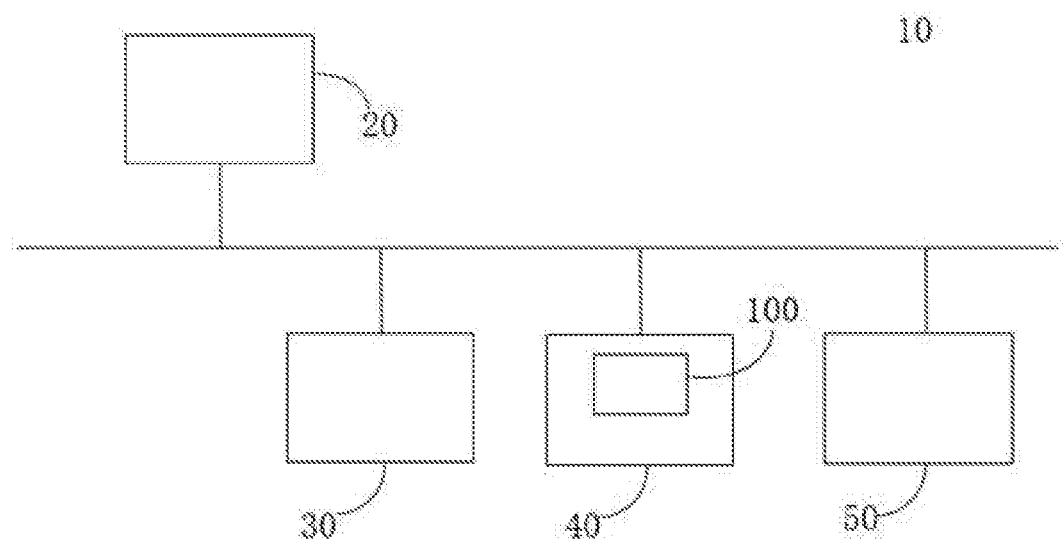
FIG. 6 is a block diagram of an electronic device according to one embodiment of the present invention.

Referring to FIG. 6, it is a block diagram of an electronic device according to one embodiment of the present invention. The electronic device 10 can be a handheld electronic device, such as a tablet computer or a smart phone. The electronic device 10 includes a touch panel 20 having a touch screen interface 500, a central processing unit (CPU) 30, and a memory device 40, and a data bus 50 connected to the touch panel 20, the central processing unit 30, and the memory device 40. The system 100 for controlling the rotation of the object on the touch screen 20 is stored in the memory device 40. Memory device 40 includes, but is not limited to, a random memory storage (RAM), a read only memory (ROM), an optical disk, or a hard disk.

The central processor 30 reads from a system 100 stored in the memory device 40 that controls the rotation of the object on touch screen 20 when the electronic device is operating. When the single touch setting module 200 detects that the user performs single touch on the touch screen interface 500 for more than a predetermined time which is about 3 seconds, the central processing unit 30 executes the single touch driving module 300. Then, the object is activated to rotate, and the image processing module 400 is executed to rotate the object as the user's finger is rotating the object on the touch screen 20. When the user stops to rotate the object at an angle and leaves the touch operation mode, the object remains rotated at the rotation angle. Moreover, the object is scaled to fit with the touch screen interface 500 when the object is rotating.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A system for controlling a rotation of an object on a touch screen, comprising:
   a touch screen interface;
   a single touch setting module for detecting a single touch action of the touch screen interface;
   a single touch driving module for receiving information from the single touch setting module and activating a rotating action on the object; and
   an image processing module, the image processing module comprises an object rotating module and an object scaling module;
   wherein the object rotating module performs the rotating action to rotate the object, and the object scaling module scales the object size of the object to fit the touch screen interface; and the single touch action is performed by motionlessly touching a specific location on the touch screen interface for a predetermined time.

2. The system for controlling a rotation of an object on a touch screen according to claim 1, wherein the predetermined time is about 3 seconds.

3. The system for controlling a rotation of an object on a touch screen according to claim 1, wherein the object rotating module rotates the object in a clockwise direction.

4. The system for controlling a rotation of an object on a touch screen according to claim 1, wherein the object rotating module rotates the object in a counterclockwise direction.

5. The system for controlling a rotation of an object on a touch screen according to claim 1, wherein when the object rotating module rotates the object, a rotation angle is displayed on the touch screen interface, and when the object rotating module stops rotating the object, the object remains rotated at the rotation angle.

6. The system for controlling a rotation of an object on a touch screen according to claim 1, wherein the object comprises an image or a video.

7. The system for controlling a rotation of an object on a touch screen according to claim 1, wherein the object rotating module rotates the object at an arbitrary angle.

\* \* \* \* \*